United States Patent [19]

Martinson

[11] Patent Number: 4,571,593

[45] Date of Patent: Feb. 18, 1986

[54] HORN ANTENNA AND MIXER CONSTRUCTION FOR MICROWAVE RADAR DETECTORS

[75] Inventor: Glen D. Martinson, Oakville, Canada

[73] Assignee: B.E.L.-Tronics Limited, Mississauga, Canada

[21] Appl. No.: 606,895

[22] Filed: May 3, 1984

[51] Int. Cl.⁴ .......................................... H01Q 13/02
[52] U.S. Cl. ................................... 343/783; 343/786; 455/271; 455/327
[58] Field of Search ............... 343/783, 786; 455/271, 455/281, 327

[56] References Cited

U.S. PATENT DOCUMENTS

| | | | |
|---|---|---|---|
| 3,339,275 | 9/1967 | Anderson et al. | 343/786 |
| 3,530,482 | 9/1970 | Palmer | 343/786 |
| 4,058,813 | 11/1977 | Risko | 343/786 |
| 4,353,076 | 10/1982 | Monser et al. | 343/786 |
| 4,411,022 | 10/1983 | Clifton et al. | 455/328 |

*Primary Examiner*—Eli Lieberman
*Attorney, Agent, or Firm*—Donald E. Hewson

[57] ABSTRACT

A horn antenna construction, particularly for use in microwave radar detector circuits, comprises a molded horn element that is open at its bottom side, with a ridge molded into its flared top surface, and being electrically conductive at least at microwave frequencies such as in the X-band and K-band. The open bottom of the horn element mates to a conductive upper surface on a mounting board, and the horn is drawn down onto the mounting board so that its upper surface forms the bottom of the horn. Thus, the ridge is brought into physical and electrical contact with a feed strip formed in a microstrip board on the mounting board, that has a mixing diode or diodes associated therewith. By this construction, there is a positive and dimensionally stable association of the throat of the horn and the ridge to the feed strip and the mixing diode(s), without the necessity of any solder, inserted connectors or mounting pins, or the provision of any tuning posts or screws. Moreover, very efficient energy conversion, and thereby increased sensitivity, is assured because the horn, the feed strip and certain matching and terminating stubs on the microstrip board assure good isolation between the mixing ports and low energy loss at the mixer.

14 Claims, 6 Drawing Figures

HORN ANTENNA AND MIXER CONSTRUCTION FOR MICROWAVE RADAR DETECTORS

FIELD OF THE INVENTION

This invention relates to microwave radar detectors, and particularly to the construction of a horn antenna and mixer therefor.

BACKGROUND OF THE INVENTION

Horn antennas for both receiving or transmitting microwave energy are well known, and it is well known to make such horns of an electrically conductive material or of a non-conductive material that is plated or coated in some way with an electrically conductive material. Moreover, horn antennas that are specifically designed as receiving horns, of no matter what frequency, are required to be dimensioned and flared so as to achieve a concentration of low energy but discernable fields at one or more specific frequencies in the throat area of the horn. Detectors—often by way of a mixing diode or diodes—are inserted or placed at the throat of the horn so as to receive the energy that is present by way of those fields at the frequency or frequencies for which the horn has been designed.

Most often, in the case of receiving horns that are particularly for use and operation at microwave frequencies such as the X-band or K-band frequencies that are used for police speed detection radar and intruder detection radar for building or zone security, a highly sensitive horn is required. This is particularly so where the source of the radar or microwave frequency energy to be detected is at some considerable range from the detector; and in such instances, the physical placement of the mixing diode with respect to the throat of the horn is important. Generally, while planar aberrations can be corrected by a lens placed in front of the horn, there is still the requirement that there must be a positive coupling at the correct frequency between the field collector—the ridge—of the horn and the detecting circuitry such as the mixing diode or diodes. This usually requires that there be at least a tuning post positioned in the throat so as to be sure that the horn and its coupling operates at the correct frequency or frequencies, and this is at least in part brought about because of the physical placement of the mixing diode within the throat of the horn. These problems, therefore, carry with them the additional problem of frequency stability with temperature, and/or sensitivity, by virtue of the physical mounting and placement of the detecting circuitry with respect the throat and the field collector or ridge of the horn.

The present invention overcomes these problems by providing a positive, physically dimensionally stable coupling of the ridge of the horn to a feed strip for a mixing diode or pair of diodes mounted in association with a microstrip board; and the present invention also provides a horn antenna construction that is easy to mount using standard assembly line technology without the requirement for tuning or balancing the energy collection or detection at the throat of the horn.

In particular, the present invention overcomes those and other problems as discussed hereafter, by the provision of a horn antenna construction where a substantially rigid and planar mounting board having upper and lower surfaces has a microstrip board mounted on the upper surface thereof, where the microstrip board has a mixing diode or diodes mounted in association therewith, and a feed strip for the diode or diodes, and having the feed strip located at or near a first edge of the microstrip board on the upper, exposed side thereof. A one-piece molded horn element is provided that has an open bottom, an upwardly flared top wall and a pair of side walls, and having a downwardly extending ridge formed on the underside of the top wall. The ridge extends rearwardly to the throat of the horn, and extends downwardly at least in the throat area to such an extent that when the molded horn element is secured to the upper side of the mounting board, the bottom edge of the ridge in the throat area is brought into physical and electrical contact with the feed strip; and moreover, the upper surface of the mounting board then forms the bottom wall of the horn.

Provisions are also made according to the present invention for extremely good isolation among the high frequency input port from the horn, the local oscillator input frequency port from the local oscillator, and the intermediate (I.F.) output port, of the mixer which is mounted on the microstrip board. This is accomplished particularly by providing a pair of mixing diodes connected in anti-parallel, and one-quarter wavelength stub(s) for the operating frequency or frequencies of the horn on the far side of the mixing diodes from the feed strip, so as to provide a virtual short circuit at the far side of the mixing diode for the operating frequency or frequencies; and by dimensioning the horn throat so that it appears as a reactive impedance and thereby precludes outward radiation of energy at the local oscillator (L.O.) frequency but permits ground return of the L.O. signal; and by the provision of a low pass filter below the L.O. frequency so as to permit only I.F. frequency signals to exit from the I.F. port of the mixer.

The prior art includes ANDERSON ET AL, U.S. Pat. No. 3,339,275, issued Sept. 5, 1967. That patent teaches a method of making a horn antenna where two identical half sections are molded and secured together by flanges. The patent teaches the mounting of a centre conductor and a cone in the throat of the assembled horn. However, it must also be noted that the horn is intended for use over frequency ranges of 50 to 500 mHz; and has an overall length of eighteen feet and an aperture diameter of twelve feet.

PALMER, U.S. Pat. No. 3,530,482, issued Sept. 22, 1970, teaches a partitioned horn having variable flare sidewalls. Means are provided to change the physical dimensions, and thus the energy sensitivity, in the throat of the horn.

RISKO, U.S. Pat. No. 4,058,813, issued Nov. 15, 1977, teaches a wave guide horn antenna that may be assembled from sheet metal, and which may have several different embodiments. In any event, the horn antenna that is taught in that patent is one which still requires a tuning screw in the throat of the horn, and is one where the precise physical dimensions of the horn and thus its energy frequency sensitivity are not predictable due to the manufacturing processes that are employed.

BRIEF DESCRIPTION OF THE DRAWINGS

There follows hereafter a description of the present invention, in association with the accompanying drawings, in which.

DESCRIPTION OF THE PREFERRED EMBODIMENTS

As previously stated, the present invention provides a horn antenna construction which is particularly adapted for use in microwave detection circuits, such as radar detectors that operate in the X-band and K-band; that is, at 10.525 GHz and 24.150 GHz, respectively. Three principal structural members include a substantially rigid and planar mounting board, shown generally at 12 in FIG. 2; a microstrip board 14 on the upper surface of the mounting board 12, also shown in FIG. 2; and a one-piece molded horn element 16, indicated in FIG. 1. The entire assembly is indicated at 10 in FIG. 3, as viewed from above.

Figure 2:
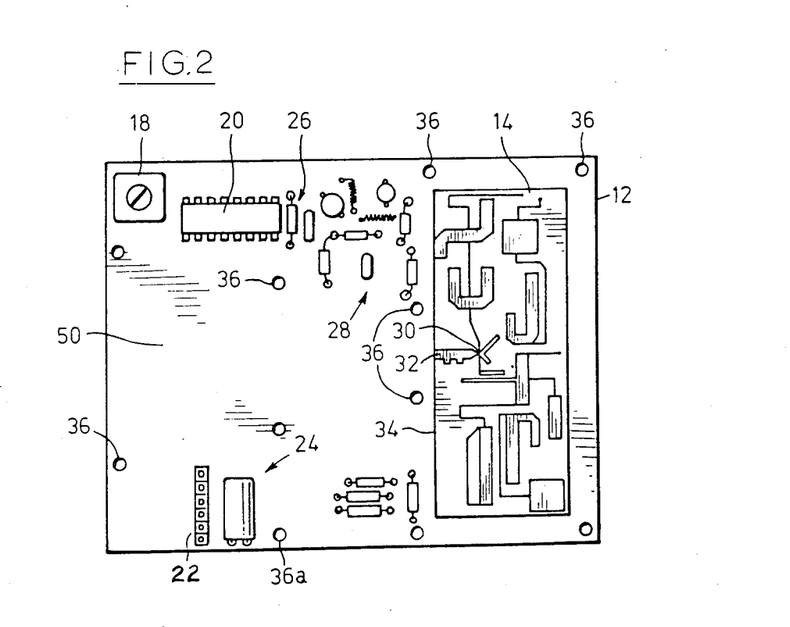
FIG. 2 is a plan view of a mounting board having a microstrip board thereon, in keeping with the present invention.
Figure 3:
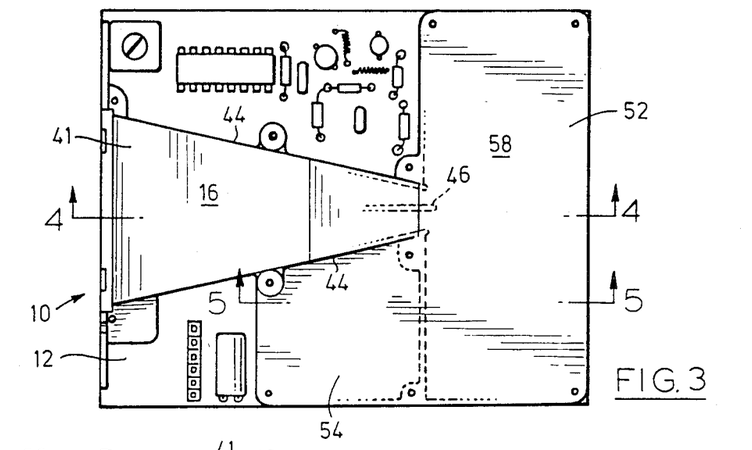
FIG. 3 is a plan view of the mounting board of FIG. 2 having the pressure cast horn of FIG. 1 mounted thereto.

The specifics of both the mounting board and the microstrip board are of no particular concern to the present invention, and are illustrated as exemplary only. For example, there may be mounted on the mounting board 12 a tunable inductor 18, a microchip 20, a connecting post terminal 22, and various and assorted capacitors, resistors, coils, etc., shown generally at 24, 26 and 28.

Likewise, the details of the microstrip board 14 are irrelevant, except to say it has printed or mounted on it—using printed circuit and microstrip technology—circuit components that include certain reactive components for both a local oscillator and a low pass filter, and other circuitry for creating and handling signals at the L.O. and I.F. frequencies which are below the horn frequencies. There is, however, included on the microstrip board a mixing diode or diodes mounted on the board at a point shown at 30, and having a conductive feed strip formed as part of the conductive circuit elements on the microstrip board, at 32. The feed strip 32 is located at or at least near the edge 34 of the microstrip board, on the upper, exposed surface thereof. Certain of the features of mounting the mixing diodes according to a preferred embodiment of the present invention are discussed hereafter, in association with FIG. 6.

It will be noted that there are a number of holes in the mounting board 12, at 36, which are generally symmetrical except as at 36a, for securing the horn element 16 to the mounting board 12. It will be noted in FIG. 1 that on the underside of the one piece molded horn element 16, there are a number of studs 38 or 38a; and it will be evident that a screw passed up from the bottom side of the mounting board 12 through the holes 36 into the tapped recesses 40 in the studs 38 will secure the one piece molded horn element 16 to the mounting board 12.

Figure 1:
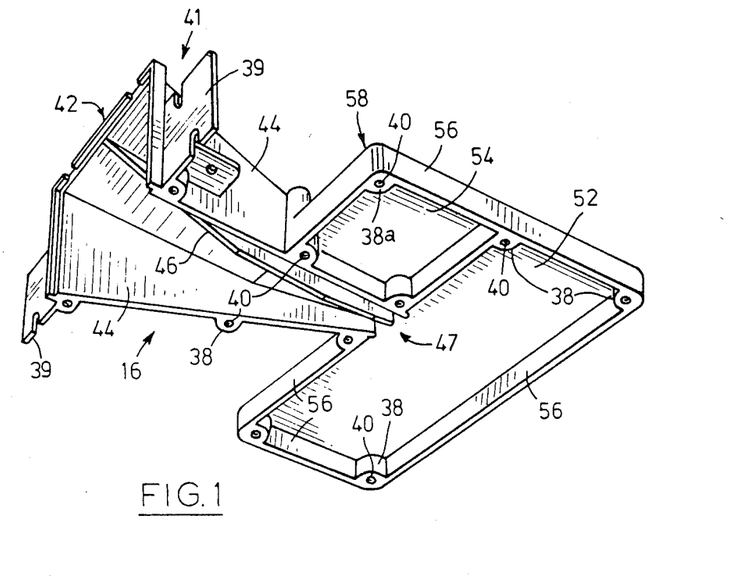
FIG. 1 is an isometric view, from beneath, of a pressure cast horn and associated shielding cavities, according to the present invention.

Referring to the one piece molded horn element 16, it is seen that in the horn portion 41 thereof, there is an upwardly flared top wall 42 and side walls 44; and it will be seen that there is an open bottom which is defined simply by the bottom edges of the side walls 44. Within the horn portion 41, there is a ridge 46, the precise geometry of which is irrelevant except that it is dimensioned so as to be a field collector in the throat area 47 of the horn portion 41, at least at the X-band and K-band frequencies.

Figure 4:
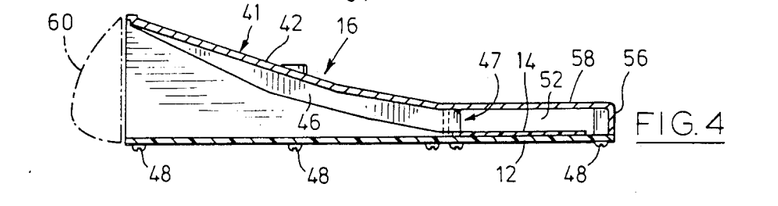
FIG. 4 is a sectional view taken in the direction of arrows 4—4 in FIG. 3.
Figure 5:
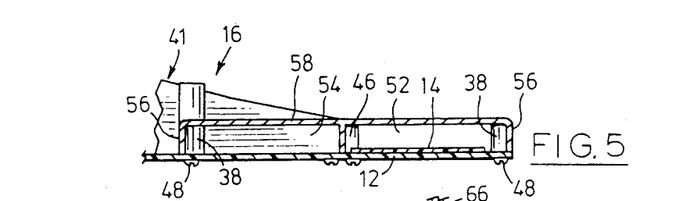
FIG. 5 is a sectional view taken in the direction of arrows 5—5 in FIG. 3.

From FIG. 4, it will be clear that by the insertion and tightening of screws 48 through holes 36 and into tapped recesses 40 of studs 38, and as the one piece molded horn 16 is drawn down onto the mounting board 12, the vertical placement of the ridge 46—and its height in the throat area 47—is such that it will be brought into both physical and electrical contact with the feed strip 32 on the upper surface of the microstrip board 14. Moreover, it will be seen that the upper surface of the mounting board 12, in the area generally designated at 50, will form the bottom wall of the horn 41, so that the horn is defined by that bottom wall, its side walls 44 and its top wall 42. For convenience of mounting other circuit components, there may also be a pair of wings 39 that are formed at each side of the mouth of the horn 41, extending outwardly from the side walls 44.

For completeness of the horn construction, of course, a ground plane is created at least in the area 50 on the upper surface of the mounting board 12, by plating or coating the mounting board with a conductive material. Moreover, when the molded horn element 16 is secured to the upper surface of the mounting board 12 by fasteners 48, a connection is made between the bottom surface of the side walls 44 and the conductive upper surface of the mounting board 12, and because at least the inside surfaces of the one piece molded horn element 16 are conductive, an effective ground at the intermediate frequency is assured for the mixing diode through the physical and electrical connection between the ridge 46 in the throat area 47 and the feed strip 32 for the mixing diode.

As to the construction of the one piece molded horn element 16, it is most conveniently preesure cast from zinc or other appropriate metal; but it may be constructed from such non-conductive materials as an injection molded thermoplastic, which would then be conductively coated at least on the inner surface. Other techniques such as laid-up epoxy and glass fibre construction may be used, particularly at lower frequencies, but dimensional stability is better assured when the element is either injection molded or more particularly when it is pressure cast of metal.

Of course, the under surface of the mounting board 12 would normally carry a printed circuit, again formed in the usual manner and with conventional printed circuit techniques, and the circuit elements 24, 26, and 28 that are mounted on the upper surface of the mounting board 12 are electrically connected through the board to the circuit lines on the underside thereof. By the same token, the elements on the microstrip board 14 are isolated from the ground plane on the upper surface of the mounting board 12 by virtue of the dielectric material of the microstrip board; and thus, local oscillators operating at microwave frequencies or intermediate frequencies thereof, may be mounted and shielded on the mounting board or the microstrip board.

In particular, it should be noted that there are two areas or cavities that are formed in the one piece horn construction element 16, at 52 and 54, and each of those cavities are defined by having vertically extending walls 56 and an upper wall or cover 58. If the ground plane or conductive coating on the upper surface of the mounting board 12 underlies the bottom edges of the vertically extending walls 56, then there may be mounted into the cavities 52 or 54 local oscillators, such as a first local oscillator mounted on the microstrip board 14 within the cavity 52, and a second local oscillator mounted on the mounting board 12 within the cavity 54, and they will be shielded.

Because the horn 41 (which is now said to be defined by a flat bottom surface 50, a pair of side walls 44 and an upper wall 42 that flares upwardly) has the configuration so defined, there may be some elevation distortion in respect of the microwave energy received and concentrated by the horn. This may be overcome for the most part by the placement of a lens—such as that indicated by ghost lines at 60 in FIG. 4—in front of the horn 41.

Several very distinct advantages are gained from the horn antenna construction of the present invention. They are, in particular, that there is substantial temperature stability, in that the physical contact of the ridge 46 in the throat area 47 to the feed strip 32 is assured even when the horn antenna construction is exposed or subjected to temperature excursions—as from summer to winter, or even by being taken from room temperature to extreme heat or extreme cold. Moreover, by properly dimensioning the throat area 47 and the broad band horn 41, any tuning that is necessary may be accomplished by the presence of printed elements on the microstrip board 14, without the necessity of physically tuning the throat area 47. The mixing diode may be securely physically mounted in the microstrip board 14, and there is a positive coupling between the ridge 46 and the low energy microwave frequency field that exists on that ridge, with the feed strip 32 on the microstrip board 14.

Because of the positive physical mounting of the mixing diode, and the physical contact and conductivity from the horn to the mixer feed strip 32, there is no necessity for providing a plated-through hole from the bottom of the mounting board 12 to provide a ground for the mixing diode—the horn provides an effective ground return at the intermediate frequency and it also provides a return for the local oscillator signal.

The mechanical coupling by compression of the ridge 46 to the mixing strip 32 is most conveniently effected by passing a plurality of screws 48 through the holes 36 and into the tapped recesses 40 in studs 38; but other means such as fasteners passed downwardly to nuts mounted on the bottom side of the mounting board 12, or compression fasteners around the periphery of the horn element 16, may also be used.

It will be noted that, especially if the one piece horn element 16 is pressure cast from zinc, the die in which it is cast is very easily constructed. This is because the horn, the ridge 46, the side walls 44, the side walls 56 of the cavities, the studs 38, and all other features, are formed on the underside or the "pull" side of the casting. Therefore, a single pull pressure casting is possible, making the provision of a cast zinc microwave horn very economical. It is even more economical when it is considered that, by virtue of the present invention, there is no necessity to provide a tuning post or other physical and physically movable structures in the throat area.

Moreover, because the present horn antenna construction provides for a single pull pressure casting—or a very easily injection molded part having no side movement or re-entrant shapes or requirements—and having temperature stability and effective shielding of first and second local oscillators, the entire assembly may be very economically provided.

Figure 6:
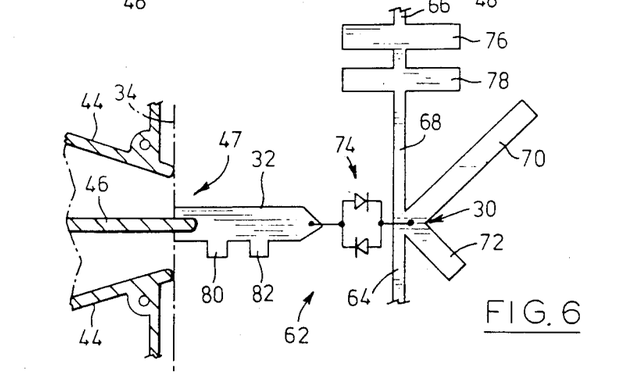
FIG. 6 is a diagrammatic view of the mixer portion of the microstrip board and its relationship to the horn.

Finally, turning now to FIG. 6, another advantage of the horn construction of the present invention may be realized. That is, because of the physical mounting of the throat 47 of the horn and its ridge 46 with respect to the feed strip 32, the mixing diode may be physically and securely mounted to the microstrip board. This gives rise to the provision for microstrip printed circuit elements that are operable at microwave frequencies, and thereby very effective port isolation of a three port mixer is achieved.

Assuming that the horn 41 is essentially dimensioned to operate the X-band and K-band frequencies (10.525 GHz and 24.150 GHz, respectively), a mixer can be provided as indicated in FIG. 6—which is set out as exemplary and is not intended to specifically relate to physical details and dimensions. In any event, the mixer is indicated generally at 62, and can be said to comprise three ports: the high frequency port is essentially defined by the feed strip 32; the local oscillator (L.O.) port is defined by the circuit strip 64; and the intermediate frequency output port is defined at the circuit strip 66. All of those elements, and the other elements shown in FIG. 6 except the horn and the diodes, may be printed directly onto the microstrip board.

As stated above, the horn having sidewalls 44 is mounted with respect to the feed strip 32 so that the ridge 46 at least overlies a portion of the feedstrip 32 and is in physical and electrical contact therewith. A circuit strip 68 is provided; and connection point 30 is defined, as being where a one-quarter wavelength stub 70 for the X-band, and a one-quarter wavelength stub 72 for the K-band, contact the circuit strip 68. A pair of mixing diodes 74, which are usually mounted on a mounting stratum in anti-parallel connection, is connected from the end of the feed strip 32 to the connection point 30. A pair of elements 76 and 78 are also provided on the microstrip board between the circuit strip 68 and the circuit strip 66; and the elements 76 and 78 function to provide a low pass filter as described hereafter.

Likewise, a further pair of matching studs 80 and 82 are provided somewhere along the length of the feed strip 32, as described hereafter.

One of the aims of the present invention is to provide means to convert as much of the high frequency energy that appears at the horn ridge 46 and is thereby transferred to the feed strip 32, to intermediate frequency energy at the circuit strip 66 for further signal handling (which is beyond the scope of the present invention), as is possible. There should be good isolation between the three ports for the mixer, which ports are defined at feed strip 32, and circuit strips 64 and 66. First, by the provision of the one-quarter wavelength stubs 70 and 72, a virtual short circuit at the X-band and K-band frequencies at the connection point 30 is assured. Therefore, any X-band or K-band frequency energy appearing across the mixing diodes 74 will cause conduction excursions by one or the other of the diodes. [It should be recognized, of course, that the horn element 16 provides a good ground return for the local oscillator and I.F. frequencies that are present on the microstrip board 14.] Any energy reflected back to the feed strip from the mixing diode 74 will be cancelled by an out of phase reflection from the matching stubs 80 or 82, when they are properly placed along the length of the feed strip 32. Thus, as much high frequency signal energy as possible will be converted to I.F. signal energy; thereby increasing the sensitivity of the radar detector in which the horn antenna construction of the present invention is mounted.

Considering that the local oscillator frequency may be in the order of 6.0 GHz (more or less), and that the I.F. frequency is in the order of 1.0 GHz (more or less), the low pass filter elements 76 and 78 are therefore placed and dimensioned so as to provide a low pass filter of approximately 2.0 GHz. Therefore, there is good isolation of the I.F. signal on the circuit strip 66 from the L.O. port at 64 or the high frequency port at 32.

Moreover, because of the virtual short circuit at the X-band and K-band frequencies at the connection point 30, there is futher assurance that there will be no leakage of high frequency energy past the connection point 30 into either the L.O. port at circuit strip 64 or the I.F. output port at circuit strip 66.

Because of the physical dimension of the throat 47 of the horn, between the sidewalls 44, the throat between the ridge 46 and either sidewall 44 appears as a reactive impedance at the first L.O. frequency, so that there is no outward radiation of local oscillator frequency from the horn 41, and a return path is provided for the L.O. signal to ground. Moreover, the physical dimensioning is such that there is no outward radiation of I.F. frequency signals from the horn 41, because the horn throat 47 acts as an effective ground at the I.F. frequency. These facts, therefore, provide good I.F. to high frequency isolation and good L.O. to high frequency isolation.

Finally, the low pass filter that is provided by the circuit elements 76 and 78 provides for good local oscillator to intermediate frequency port isolation.

Other specific details of the structure of the microstrip board 14 and the mounting board 12, and of the circuit elements mounted or printed on them, are not relevant to the present discussion; however, it is clear that according to the present invention a horn antenna construction can be provided that will work at given frequencies—such as the X-band or K-band frequencies—where the operating frequency is determined by the physical dimensioning of the horn, the ridge and the throat area. Positive, temperature stable coupling of the ridge and the field occuring on it to the feed strip for the mixing diode are assured, without the necessity of tuning a local oscillator cavity or even adjusting the physical mounting of the mixing diode in the throat of a microwave horn. Also, good energy conversion and therefore high sensitivity, together with good signal isolation at the various operating, local oscillator, and first intermediate frequency ports of the mixer, are assured. The accompanying claims define the ambit of this invention.

What is claimed is:

1. A horn antenna construction for use in microwave detection circuits, comprising:
   a substantially rigid and planar mounting board having upper and lower surfaces;
   a microstrip board on the upper surface of said mounting board, having at least one mixing diode and a feed strip therefor, where the feed strip is located at or near a first edge of the microstrip board and on the upper, exposed side thereof;
   and a one-piece molded horn element having an open bottom, an upwardly flared top wall and a pair of side walls, and having a downwardly extending range formed on the underside of said top wall;
   where said ridge extends rearwardly to the throat of said horn, and extends downwardly at least in said throat area to an extent that when said one-piece molded horn element is secured to the upper side of said mounting board, the bottom edge of said ridge in said throat area is brought into physical and electrical contact with said feed strip, and the upper surface of said mounting board forms the bottom wall of the horn.

2. The horn antenna construction of claim 1, where at least the portion of said upper surface of said first mounting board that is beneath the horn is coated with a conductive material.

3. The horn antenna construction of claim 1, where said one-piece molded horn element is pressure cast zinc.

4. The horn antenna construction of claim 1, where said microstrip board has a pair of mixing diodes connected in anti-parallel, mounted in association therewith.

5. The horn antenna construction of claim 1, where said one-piece molded horn element is an injection-molded thermoplastic having a conductive coating at least on its underside.

6. The horn antenna construction of claim 4, where the lower surface of said mounting board carries a printed circuit, and the upper surface is plated so as to form a ground plane, at least in the area of said horn.

7. The horn antenna construction of claim 4, where said one-piece molded horn element is secured to said mounting board by fastening means passed through said mounting board.

8. The horn antenna construction of claim 4, where said one-piece molded horn element is formed with at least one additional portion having vertically extending walls and an upper wall, so as to form a cavity that will overlie and surround a portion of circuit components mounted on said mounting board or on said microstrip board, and thereby so as to form an isolation shield for said components covered thereby.

9. The horn antenna construction of claim 8, where a first cavity is formed behind said throat, so as to cover and shield said microstrip board having a first local oscillator associated with said mixing diodes, and where said ridge extends slightly into said first cavity.

10. The horn antenna construction of claim 4, where said pressure cast zinc one-piece horn element is formed and dimensioned so that there is energy by way of electrical fields at the X-band and K-band frequencies on said ridge, for coupling from said ridge to said feed strip and thence to said mixing diodes.

11. The horn antenna construction of claim 10, where a lens is placed at the front end of the horn.

12. The horn antenna construction of claim 4, where said feed strip has at least one matching stub associated therewith to cancel any energy reflected from the mixing diodes at the at least one frequency for which said horn is dimensioned, where a stub of one-quarter wavelength of said at least one frequency is located on the far side of said mixing diodes from said feed strip so as to cause a virtual short circuit at said at least one frequency at the connection point of said one-quarter stub and said mixing diodes, and a local oscillator and a low pass filter for an intermediate frequency are also connected to said connection point.

13. The horn antenna construction of claim 12, where the throat of said horn is so dimensioned that it appears as a reactive impedance at the frequency of said local oscillator, so that there is effectively no outward radiation of energy at that frequency from said horn.

14. The horn antenna construction of claim 13, where one-quarter wavelength stubs are provided for X-band and K-band frequency signals at the far side of said mixing diodes from said horn.

* * * * *

UNITED STATES PATENT AND TRADEMARK OFFICE
CERTIFICATE OF CORRECTION

PATENT NO. : 4,571,593

DATED : February 18, 1986

INVENTOR(S) : Glen D. Martinson

It is certified that error appears in the above-identified patent and that said Letters Patent is hereby corrected as shown below:

Column 8, Line 4: Change "range" to --ridge--.

Signed and Sealed this

Third Day of January, 1989

Attest:

DONALD J. QUIGG

*Attesting Officer*  *Commissioner of Patents and Trademarks*

REEXAMINATION CERTIFICATE (1885th)
United States Patent [19]
Martinson

[11] B1 4,571,593
[45] Certificate Issued Dec. 22, 1992

[54] HORN ANTENNA AND MIXER CONSTRUCTION FOR MICROWAVE RADAR DETECTORS

[75] Inventor: Glen D. Martinson, Oakville, Canada

[73] Assignee: B.E.L.-Tronics Limited, Mississauga, Canada

Reexamination Request:
No. 90/002,683, Mar. 19, 1992

Reexamination Certificate for:
Patent No.: 4,571,593
Issued: Feb. 18, 1986
Appl. No.: 606,895
Filed: May 3, 1984

Certificate of Correction issued Jan. 3, 1989.

[51] Int. Cl.[5] .......................................... H01Q 13/02
[52] U.S. Cl. ................... 343/783; 343/786; 455/271; 455/327
[58] Field of Search ............... 343/783, 786; 455/271, 455/281, 327

[56] References Cited

U.S. PATENT DOCUMENTS

| | | | |
|---|---|---|---|
| 2,979,676 | 10/1957 | Rueger | 333/34 |
| 3,339,275 | 9/1967 | Anderson et al. | 343/786 |
| 3,530,482 | 9/1970 | Palmer | 343/786 |
| 4,058,813 | 11/1977 | Risko | 343/786 |
| 4,157,550 | 6/1979 | Reid et al. | 343/786 |
| 4,353,076 | 10/1982 | Monser et al. | 343/786 |
| 4,411,022 | 10/1983 | Clifton et al. | 455/328 |

FOREIGN PATENT DOCUMENTS

074613 3/1983 European Pat. Off. .

OTHER PUBLICATIONS

Magarshack, "All FET 12 GHz Satellite Television Receivers", Int'l Conf. on Comm., 26.3.1–26.3.5, (6/10–14, 1979 Boston, Mass.
Araki et al., "A Quasi-millimeter-wave Integrated Mixer, ECL1384" Rev. Elec. Comm., vol. 20, No. 9–10, 788–792 (1972).

*Primary Examiner*—Michael C. Wimer

[57] ABSTRACT

A horn antenna construction, particularly for use in microwave radar detector circuits, comprises a molded horn element that is open at its bottom side, with a ridge molded into its flared top surface, and being electrically conductive at least at microwave frequencies such as in the X-band and K-band. The open bottom of the horn element mates to a conductive upper surface on a mounting board, and the horn is drawn down onto the mounting board so that its upper surface forms the bottom of the horn. Thus, the ridge is brought into physical and electrical contact with a feed strip formed in a microstrip board on the mounting board, that has a mixing diode or diodes associated therewith. By this construction, there is a positive and dimensionally stable association of the throat of the horn and the ridge to the feed strip and the mixing diode(s), without the necessity of any solder, inserted connectors or mounting pins, or the provision of any tuning posts or screws. Moreover, very efficient energy conversion, and thereby increased sensitivity, is assured because the horn, the feed strip and certain matching and terminating stubs on the microstrip board assure good isolation between the mixing ports and low energy loss at the mixer.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *